United States Patent
den Boer et al.

(12) 
(10) Patent No.: US 6,225,968 B1
(45) Date of Patent: May 1, 2001

(54) METHOD AND SYSTEM FOR ADDRESSING LCD INCLUDING DIODES

(75) Inventors: Willem den Boer; Yair Baron, both of Plymouth, MI (US)

(73) Assignee: OIS Optical Imagaing Systems, Inc., Norville, MI (US)

(*) Notice: Subject to any disclaimer, the term of this patent is extended or adjusted under 35 U.S.C. 154(b) by 0 days.

(21) Appl. No.: 08/935,678

(22) Filed: Sep. 23, 1997

(51) Int. Cl.⁷ ..................................................... G09G 3/36
(52) U.S. Cl. ............................................... 345/91; 345/96
(58) Field of Search ..................... 345/91, 92, 96, 345/98, 37; 349/40; 257/353

(56) References Cited

U.S. PATENT DOCUMENTS

| | | |
|---|---|---|
| 4,731,610 | 3/1988 | Baron et al. |
| 5,184,235 | * 2/1993 | Sukegawa .............................. 349/40 |
| 5,272,370 | * 12/1993 | French ................................ 257/353 |
| 5,576,728 | 11/1996 | Maeda . |

FOREIGN PATENT DOCUMENTS

| | | |
|---|---|---|
| 0217466 | 4/1987 | (EP) . |
| 0434627 | 6/1991 | (EP) . |
| 0447077 | 9/1991 | (EP) . |
| 0475770 | 3/1992 | (EP) . |
| 2605778 | 10/1986 | (FR) . |
| 2217891 | 11/1989 | (GB) . |

OTHER PUBLICATIONS

"A Two–Diode Pixel Circuit and Addressing Method for MIM LCDS" by den Boer, Proceedings Euro Display '96, Oct. 1996.

* cited by examiner

*Primary Examiner*—Steven Saras
*Assistant Examiner*—Alecia D. Nelson
(74) *Attorney, Agent, or Firm*—Laff, Whitesel & Saret, Inc.

(57) ABSTRACT

A system and method for driving a MIM diode inclusive AMLCD includes providing each pixel with a pair of select lines and a single data line. Drive schemes are provided which increase the circuits tolerance for spacial and temporal variations in MIM device characteristics, improve response time, increase the circuit's tolerance for RC delays on data lines, and reduces the potential for crosstalk or image retention. in certain embodiments, where each pixel includes a pair of select lines, and a single data line, the select voltage on the first select line alternates between $V_S+V_{offset}$ and $V_S-V_{offset}$ for subsequent frames, while the select voltage on the other select line alternates between $-V_S+V_{offset}$ and $-V_S-V_{offset}$ for subsequent frames, thereby allowing voltage at the common node to be added to the data voltage. Accordingly, a lesser data voltage swing is required, which reduces the cost and complexity of the overall circuit.

15 Claims, 6 Drawing Sheets

METHOD AND SYSTEM FOR ADDRESSING LCD INCLUDING DIODES

This invention relates to a system and method for driving an electronic matrix array of elements, such as an active matrix liquid crystal display (AMLCD). More particularly, this invention relates to a method and system for addressing a metal-insulator-metal (MIM) diode driven matrix array, such as an LCD, including two select address lines per row.

BACKGROUND OF THE INVENTION

In known electronic matrix systems, an array of storage elements, each having a unique address, is utilized for storing electric charge and can include, for example, memory arrays and/or LCDs. In LCDs, the storage elements take the form of picture elements or pixels. The pixels generally include a pair of spaced apart electrodes having liquid crystal material disposed therebetween. Thus, each pixel constitutes a capacitor in which electric charge can be stored. The charge stored in a pixel results in a voltage potential across the opposing electrodes and an electric field across the liquid crystal material. By controlling the amount of charge stored in pixels across the array, the properties of the liquid crystal (LC) material can be controlled to obtain a desired light influencing effect or image which is displayed to a viewer.

In LCDs, alignment of the LC molecules can be obtained when the electric field applied to the LC is above a threshold value. When this occurs, a pixel becomes light transmissive or light absorbing, depending upon the relative alignment of the display's polarizers and alignment layers; when the field is below the threshold value, an opposite effect is obtained.

In LCDs, it is necessary to update the condition of each pixel at regular intervals, i.e. at a given frame rate. This is required because the pixels can retain or store the applied charge potentials for only a finite time. Updating is further required in order to change the image to be displayed (e.g. when the image is changing or moving). Accordingly, the ability to rapidly transfer to, and store electric charge in, pixels and to efficiently retain the stored charge therein for a frame period is essential.

U.S. Pat. No. 4,731,610 (to co-inventor Baron herein) discloses a driving scheme which utilizes, for example, either field effect transistors (FETs) or PIN (positive-intrinsic-negative) diodes. Unfortunately, these types of switching devices (PIN diodes and FETs), when employed in LCDs, require an undesirably high number of mask steps for fabrication, and also require a high degree of critical alignment. Accordingly, these complex structures reduce the yield of usable components per fabrication run, and therefore increase production costs.

Metal-insulator-metal (MIM) diode LCDs are easier to fabricate than FET/TFT LCDs and conventional diode LCDs. A typical MIM electronic matrix array requires between two and four thin film layers and photomask steps, as compared to 6–9 thin film layers and photomask steps for TFT arrays. Patterning of most MIM arrays can be achieved with less stringent overlay accuracy and resolution requirements, then is required for TFT arrays. As a result, less expensive photo-exposure equipment, such as scanning projection aligners, can be used, that have more than twice the throughput and cost less than half as much as flat panel steppers.

Despite their lower production costs, MIM driven LCDs are not widely used. This can be attributed to the inferior performance of typical MIM LCDs with regard to gray shade control, image retention, response time, and maximum size and resolution as compared to TFT LCDs. Accordingly, there exists a need in the art for an improved MIM LCD drive scheme, which is cheaper to manufacture, less susceptible to image retention and gray scale problems, and has good resolution.

European Patent Application 0 434 627 A2 discloses a MIM diode driven LCD, invented previously by Inventor Willem den Boer of the instant application. In the EP '627 application, the MIM diode driven LCD includes two select lines per row, and a corresponding column line for each column. Thus, each individual pixel is addressed by a single column line and a pair of select or row lines. First and second MIM diodes are utilized to address each pixel, with a one MIM per branch design being utilized (i.e. there is only a single MIM diode between the common node and each select line). Unfortunately, the drive scheme of the '627 application suffers from at least the following problems. Firstly, as shown in FIG. 3 of the '627 application, the polarity of signal on each select line is always reversed, with the reversal interval being two frames. Thus, for example, the pulses on a given select line will be positive for two frames, and then switch to a negative polarity for the next two frames, and so on. This requires sophisticated and expensive electronics which are undesirable. Secondly, the single MIM per branch design in the '627 application can result in a non-symmetric device, which requires the polarity changes discussed above. Thirdly, as shown in FIG. 3(a) of the '627 application, for example, a large number of separate voltage levels (or holding voltage levels) are required in this design. This also is expensive, and requires complex circuitry which is undesirable. Fourthly, as shown in FIG. 3(a) of the '627 application, for example, the voltage swing is 34 volts. This is so large, so as to require complex and expensive drive circuitry.

A fundamental desire in LCD driving schemes, is to reduce the complexity and costs of drive circuitry, which is always a cost sensitive component to be taken into consideration.

It is apparent from the above that there exists a need in the art for an improved MIM diode driven LCD or other electronic matrix array, which (i) is designed so as to require less complex and less expensive circuitry; (ii) has improved gray shade control; and (iii) is less sensitive to image retention than previous MIM LCDs and has had good resolution characteristics.

It is a purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing a method of addressing a liquid crystal display including metal-insulator-metal (MIM) diodes, the method comprising the steps of:

providing a plurality of pixels in the display, each of the pixels including a liquid crystal layer and a pair of electrodes which form a capacitor;

providing each pixel with first and second MIM diodes that are coupled via a common node, the common node being located between (a) the MIM diodes, and (b) the capacitor;

providing each pixel with first and second select address lines, the first select address line being coupled to the first MIM diode and the second select address line being coupled to the second MIM diode;

providing each pixel with a data address line;

in a pixel, biasing the first and second MIM diodes into and on condition to facilitate storage of charge in the capacitor of the pixel by varying a select voltage applied to the first select address line between $V_S+V_{offset}$ and $V_S-V_{offset}$ for subsequent frames, and varying a select voltage applied to the second select address line between $-V_S+V_{offset}$ and $-V_S-V_{offset}$ for subsequent frames, wherein $V_S$ is one voltage and $V_{offset}$ is another voltage that is less than $V_S$.

In certain preferred embodiments, the method further includes applying holding voltages to each of the first and second select lines during non-select periods in order to improve charge retention in the pixel.

This invention further fulfills the above-described needs in the art by providing a pixel for an LCD, the pixel comprising:

a capacitor formed by a liquid crystal layer sandwiched between first and second electrodes;

first and second MIM diodes;

a node coupling together (i) said first MIM diode; (ii) said second MIM diode; and (iii) said capacitor;

first and second parallel select lines, said first select line connected to said first MIM diode and said second select line connected to said second MIM diode;

a data line oriented perpendicular to said first and second select lines;

simultaneous offset scan driving means for charging the pixel so as to supply data to a viewer of the display, said simultaneous offset scan driving means for simultaneously applying, in a first frame, a select voltage of $V_S-V_{offset}$ to said first select line and a select voltage of $-V_S-V_{offset}$ to the second select line, and thereafter simultaneously applying, in a second frame subsequent to the first frame, a select voltage of $V_S+V_{offset}$ to said first select line and a select voltage of $-V_S+V_{offset}$ to said second select line.

This invention will now be described with reference to certain embodiments thereof as illustrated in the following drawings.

IN THE DRAWINGS

DETAILED DESCRIPTION OF CERTAIN EMBODIMENTS OF THIS INVENTION

Figure 1:
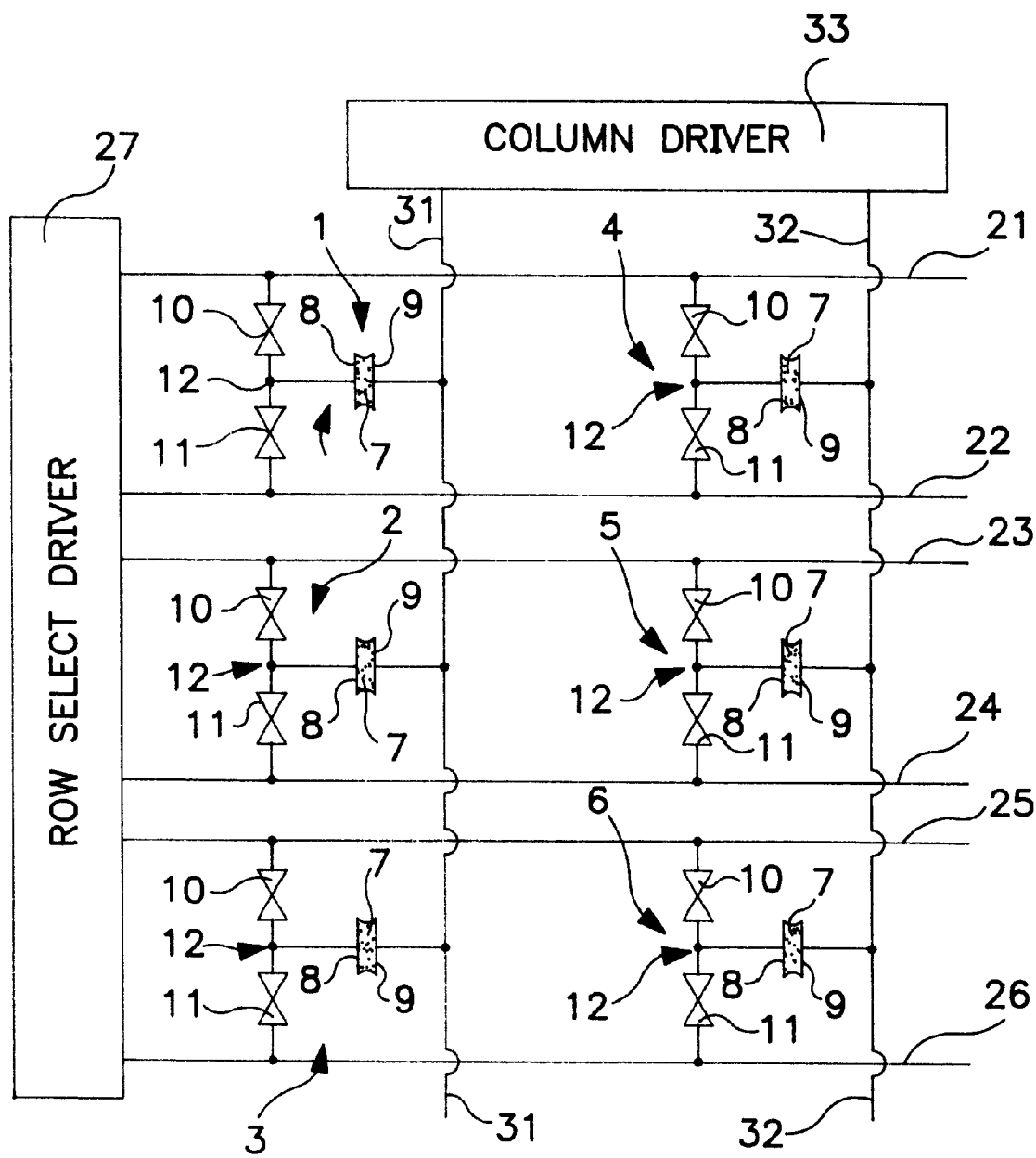
FIG. 1 is a schematic circuit diagram of an active matrix liquid crystal display (AMLCD) including a MIM diode drive scheme according to an embodiment of this invention.

Referring now more particularly to the accompanying drawings in which like reference numerals indicate like parts throughout the several views.

FIG. 1 is a schematic circuit diagram of an AMLCD according to an embodiment of this invention. The AMLCD includes a plurality of pixels 1–6 arranged in a matrix array on the active substrate of the display. Pixel 1 includes liquid crystal layer 7 sandwiched between individual pixel electrode 8 and common electrode 9, as well as MIM diodes 10 and 11 which are coupled to one another and to pixel electrode 8 via common node 12. Common node 12 is in communication with each of MIM diodes 10, 11, via branches extending therefrom, as well as with pixel electrode 8. Each of the other pixels 2–6 also includes a pair of MIM diodes 10, 11 coupled at a common node 12, as well as LC material 7 sandwiched between pixel electrodes 8 and 9. The common electrode 9 in each pixel is in electrical communication with a column or data line 31, 32.

The FIG. 1 display further includes row or select lines 21–26 that are driven and selected by row select driver 27, and column or data lines 31 and 32 which are selected and driven by column driver 33. Select lines 21–26 are all substantially parallel to one another and are oriented in a first direction, while data lines 31–32 are also substantially parallel to one another, but are oriented in a second direction that is substantially orthogonal to the first direction. Thus, select lines 21–26 are substantial orthogonal to data lines 31–32 across the active matrix array.

As illustrated in FIG. 1, a pair of row or select lines is provided for each pixel, while only a single column or data line is utilized for each pixel. Although only six pixels are illustrated, it is to be understood that the AMLCD includes additional pixels as well as additional select and data address lines sufficient in number so as to form a usable image for displaying to a viewer (e.g. see FIG. 6). Each of the pixels 1–6 herein is substantially identical.

The insulator in MIM diodes 10–11 is conventionally either anodized $Ta_2O_5$ (tantalum oxide) or Si-rich $SiN_X$ (silicon nitride) grown by plasma enhanced chemical vapor deposition (CVD). [Diamond-like carbon may also be used as an insulator in MIM diodes in this invention.] $SiN_X$ diodes have steeper current voltage characteristics than $Ta_2O_5$ diodes and a lower diode capacitance. Thus, $SiN_X$ diodes are more attractive for higher resolution displays. However, $SiN_X$ diodes suffer from device degradation and spacial non-uniformity. The pixel circuits described herein thus are designed so as to have greatly increased tolerance for spacial and temporal variations of MIM diode current-voltage characteristics, as $SiN_X$ MIM diodes are preferred in certain embodiments.

A row of pixels (e.g. pixels 1 and 4) is selected by applying simultaneously opposite polarity pulses to select lines 21 and 22 while at the same time applying data voltage to the column lines in that particular row as desired. As illustrated in FIGS. 2–4, the polarity of the voltage pulses on any given select line remain constant for that line. In other words, on select line 21, for example, the polarity of pulses thereon will always be positive while the polarity of the pulses on the corresponding select line 22 will always be negative. This allows for less complex circuitry to be utilized. This is the case with all pixels disclosed herein.

Figures 4A, 4B:
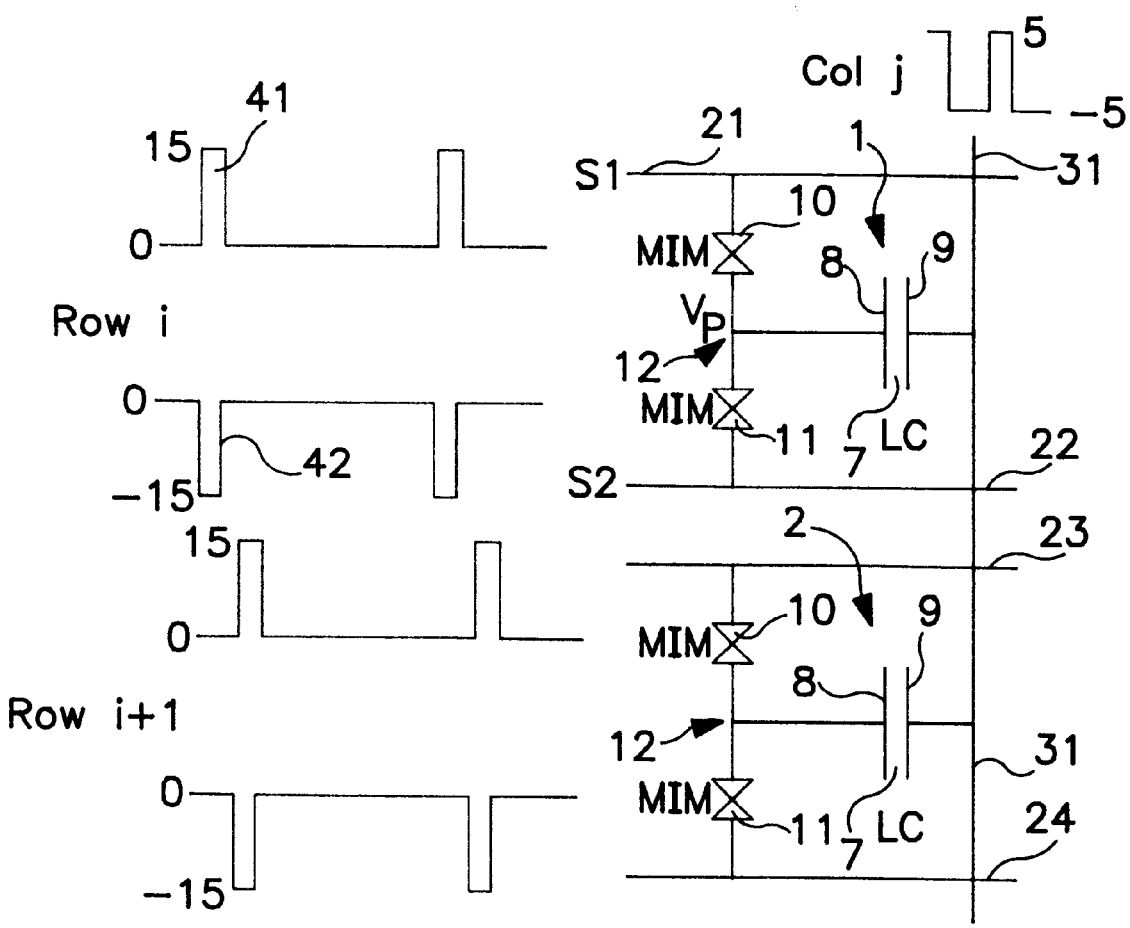
FIG. 4(a) is a circuit diagram of two pixels of FIG. 1, according to a third embodiment of this invention.
FIG. 4(b) illustrates four separate voltage v. time graphs which correspond to the select or row lines illustrated in FIG. 4(a), according to the third embodiment of this invention.

Referring now to FIGS. 1, 4(a), and 4(b), the third embodiment of this invention will first be described. Preferably, $SiN_X$ MIM diodes are utilized in this third embodiment. Two MIM diodes are connected to each LC pixel, and two separate select lines (21 and 22 for pixel 1). A row of pixels is selected by applying simultaneously opposite polarity pulses 41 and 42 of substantially equal magnitude, to the pixel, while applying data voltage to the corresponding column line 31.

Referring to prior art single MIM circuits with single row lines. Any variation in the current-voltage characteristic of the MIM device over time, with temperature, or across the display area will result in a variation of the LC voltage. In $SiN_X$ MIM diodes 10–11, the thickness and composition (i.e. Si/N ratio) of the $SiN_X$ layer determines in part the diode's current-voltage curve. Because it is difficult to control thickness and composition accurately over large area, the current voltage curve of such $SiN_X$ MIM diodes 10–11 will vary significantly across large area displays. In addition, the $SiN_X$ diode current decreases, when pulsed in the on-state for an extended period of time, leading to image retention in conventional circuits. Furthermore, because MIM current also depends on temperature, a non-uniform heating of the display will result from pixel voltage variation across the display area. Circuits herein overcome these problems.

As shown in FIGS. 4(a) and 4(b), a select voltage 41 of about 15 volts is applied to select line 21, while simultaneously a select voltage 42 of −15 volts is applied to select line 22, while a data voltage of 5 volts is applied to column or data line 31. These voltages may range from 10–30 volts for line 21, and from −10 to −30 for line 22. In the 4(a) circuit, of pixel 1, when these signals are applied, the pixel charging saturates rapidly at the data voltage and is virtually independent of MIM current variations up to 10X. The pixel charging saturates quickly, because the voltage across each MIM device 10, 11 is still 15 volts when the pixel voltage approaches the data voltage, so that a significant on-current keeps flowing until the select pulses are switched off. The pixel voltage shift at termination of the select pulses 41 and 42 is substantially eliminated in the illustrated circuit, because the capacitive feed through voltage of diodes 10–11 substantially cancels out. When the select time is reduced to about 16 microseconds, corresponding to 1,000 rows at a 60 Hz refresh rate, the illustrated FIG. 4(a) circuit can still charge the pixel almost completely. As discussed in "A Two-diode Pixel Circuit and Addressing Method for MIM LCDs," by den Boer, October 1996, the disclosure of which is incorporated herein by reference, when the FIGS. 1 and 4(a) circuit with the illustrated drive scheme is compared with a prior art MIM diode LCD drive scheme, simulations indicate that gray scale control is superior for the FIGS. 1, 4(a) circuit and that image retention from diode degradation will be greatly reduced according to this invention. The illustrated circuit herein has increased tolerance for MIM current variations with temperature, time, and across the display area.

Still referring to FIGS. 1 and 4(a)–4(b), conventional MIM LCDs operated with a conventional drive scheme suffer from poor response times caused by the nature of the single MIM switch. As a result, it is difficult to produce video images without smearing. A worse case example of slow response time is illustrated and discussed in "A Two Diode Pixel Circuit and Addressing Method for MIM LCDs," by den Boer. The circuit of FIGS. 1 and 4(a)–4(b), is an improvement over the prior art, as with this circuit the pixel voltage reaches its new RMS value immediately, because the voltage across the MIM diodes and their current, are sufficiently large to discharge the pixel with one line time.

Still referring to FIGS. 1 and 4(a)–4(b), it has been found by the instant inventors that this invention results in less voltage variation along pixel rows than prior art MIM driven circuits. This is attributed to the faster approach of the pixel voltage to the data voltage in the inventions herein than in the prior art. In sum, circuit simulations of the circuit from FIGS. 1 and 4(a)–4(b) show that this circuit has greatly increased tolerance for spacial and temporal variations in MIM driven LCDs. This circuit also has improved response time and increased tolerance for RC delays on the row and column lines. The simulations indicate that this circuit has the potential of driving more than one thousand rows in large, low cost LCDs with diagonal size exceeding 20".

Figures 2A, 2B:
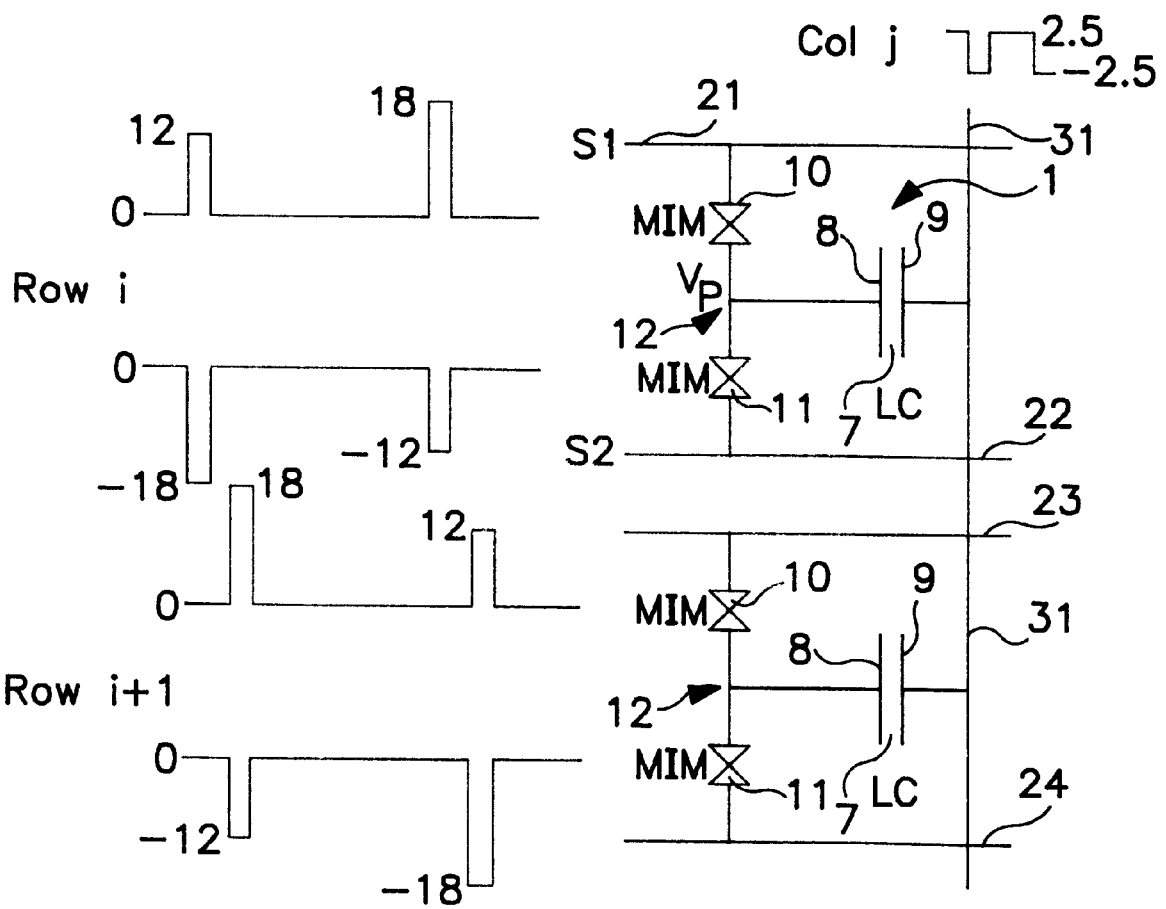
FIG. 2(a) is a circuit diagram of two different pixels of FIG. 1, on different rows, according to a first embodiment of this invention.
FIG. 2(b) illustrates four separate voltage v. time graphs which correspond to the four select lines illustrated in FIG. 2(a) [i.e. how these pixels are driven in operation].

Referring now to the first embodiment of this invention, illustrated in FIGS. 1 and 2(a)–2(b). While the third embodiment shown in FIGS. 4(a)–4(b), when operated in a simultaneous scan mode, has numerous advantages over prior art MIM LCD technology including much improved spacial and temporal gray shade control and uniformity, faster response time, reduced image retention and cross-talk, and increased tolerance for RC delays on the row and column lines, the drawback of the FIGS. 4(a)–4(b) embodiment is that it needs to have at least a ten volt swing on the data line in order to obtain sufficient voltage across LC 7 and the relatively high voltage that can occur across MIM diodes in the off-state (during the non-select period). In the off-state, the pixel voltage can vary between +10 volts and −10 volts. At 10 volts, across the MIM diode, its current can be too high to retain sufficient charge on the pixel. Accordingly, the FIGS. 2(a)–2(b) embodiment of this invention surprisingly improves upon the FIGS. 4(a)–4(b) embodiment, by alternating the select voltage on one select line between $V_S+V_{offset}$ and $V_S-V_{offset}$ for subsequent frames, while alternating the select voltage on the other corresponding select line between $-V_S+V_{offset}$ and $-V_S-V_{offset}$. In the FIG. 2(b) example, $V_S$=15 volts and $V_{offset}$=3 volts. The data voltage swing on line 31 is thus reduced to 5 volts ($V_D$ varies between −2.5 and +2.5 volts in this example) allowing the use of low cost data drivers. Vs may range from about 10–30 volts, while $V_{offset}$ may range from about 2–4 volts.

In this simultaneous offset scan of the FIGS. 2(a)–2(b) ripple drive embodiment, the maximum voltage across each MIM diode 10, 11 in the off-state is about 7 to 8 volts, resulting in improved charge retention in the LC 7 capacitance in each pixel. The cancellation of the pixel voltage shift from the two diodes is not complete in this drive scheme, because the opposite polarity pulses on lines 21 and 22, for example, are not of equal magnitude. The data voltage is applied in row inversion mode [i.e. the data signal voltage polarity is charged for each row].

Still referring to the FIGS. 2(a)–2(b) embodiment, pixel 1, for example, is driven as follows. A pulse of $V_S-V_{offset}$ (e.g. 15 volts−3 volts equals 12 volts) is applied to select line 21, while a pulse of $-V_S-V_{offset}$ (e.g. −15 volts−3 volts equals −18 volts) is simultaneously applied to select line 22, while at the same time a data voltage of 2.5 volts is applied to column line 31. This charges the LC capacitance of each pixel. Because a 30 volt differential is applied between select lines 21 and 22, after each select pulsing, each node branch has a drop of 15 volts. Thus, we have −3 volts at common node 12 after the select voltage on line 21 is 12 volts and that on line 22 is −18 volts. This −3 volts at common node 12 is added to the data voltage on column line 31.

When MIM diodes 10–11 are switched off, node 12 floats and follows the column line voltage so that, for example, if −2.5 volts are applied to column line 31, the voltage at node 12 goes to −8 volts, while select line 21 and 22 are at 0 volts. Thus, the circuit enables the system to use less voltage on the column lines (this saves cost and circuit complexity), and allows less voltage variation at both node 12 and on the column lines so that there is less leakage through MIM diodes 10 and 11. Minimizing leakage through diodes 10–11 in the MIM off-state is desirable as will be appreciated by those of skill in the art.

Still referring to FIGS. 2(a)–2(b), following the frame, when it is desired to change to image being shown to the viewer, a voltage of $V_S+V_{offset}$ (e.g. 15 volts+3 volts equals 18 volts) is applied to select line 21, while a voltage of $-V_S+V_{offset}$ (−15 volts+3 volts equals −12 volts) is applied to select line 22, while a data voltage is applied to column line 31. Following the next frame, the signal on line 21 goes back to $V_S-V_{offset}$ and the signal on line 22 goes back to $-V_S-V_{offset}$ for the next pulsing. As discussed above, the pulsing on each of lines 21 and 22 alternate between these two values for subsequent frames when the AMLCD is on. Each pixel in the active matrix array is driven in a similar manner.

Accordingly, the FIGS. 2(a)–2(b) embodiment of this invention allows the circuit to have a smaller voltage swing on the data line (i.e. column line 31), while still obtaining sufficient voltage across liquid crystal material 7 in each pixel and limiting leakage through the MIM diodes 10–11. For example, as shown in FIG. 2(b), the voltage swing on line 31 is reduced to 5 volts (from 2.5 volts to −2.5 volts) which is an improvement over the 10 volt swing shown in FIG. 4(a). This permits the circuit to take advantage of using low cost data drivers. Still further, the FIGS. 2(a)–2(b) embodiment has a reduced number of voltage levels applied to the select lines, than does the prior art discussed in the Background Section of this application. This also allows the circuit to take advantage of less complex circuitry requirements. According to certain preferred embodiments of this invention, the voltage drop on the column or data lines is no greater than about 6 volts, preferably less than or equal to about 5 volts, while the voltage swing between corresponding select lines is no greater than about 32 volts, and is preferably less than or equal to about 30 volts.

Figure 3B:
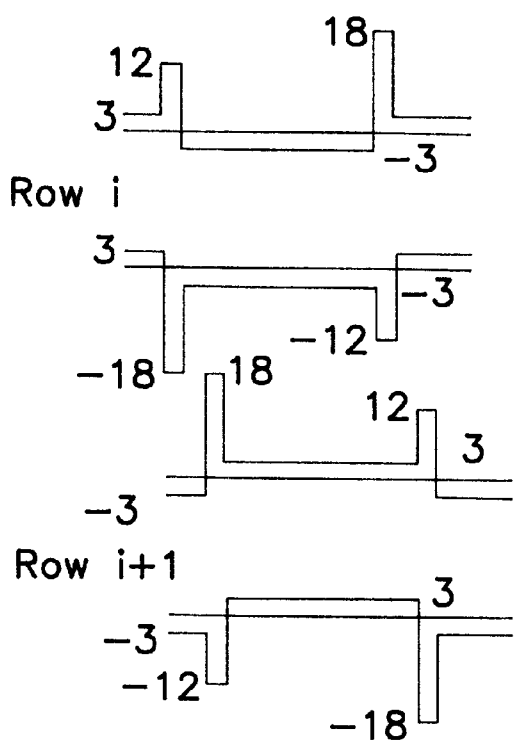
FIG. 3(b) illustrates four separate voltage v. time graphs which correspond to the four select lines in FIG. 3(a), according to the second embodiment of this invention.
Figure 3A:
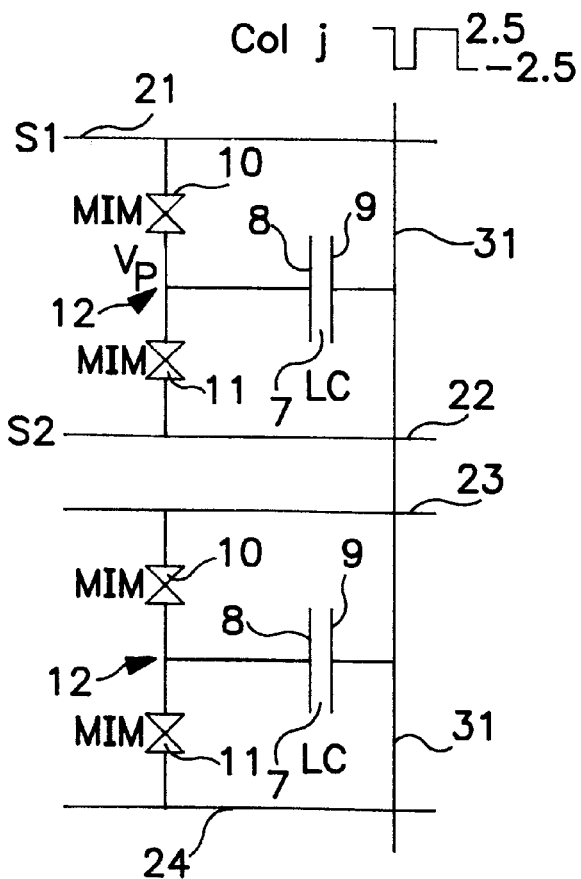
FIG. 3(a) is a circuit diagram of two different pixels of FIG. 1, on different rows, according to a second embodiment of this invention.

Referring now to the FIGS. 3(a)–3(b) embodiment of this invention, further improvement is obtained by adding holding voltages during the non-select periods, as shown in FIG. 3(b). In this simultaneous offset scan with holding voltage embodiment (i.e. the second embodiment of this invention), the maximum voltage across each MIM diode 10–11 in the off-state is further reduced to about 5 volts, improving charge retention on the LC material 7 in each pixel. The holding voltages (e.g. 3 volts or −3 volts in FIG. 3(b)) are maintained on select lines 21 and 22, respectively, until the next selection pulse. The pixel voltage shifts from the two MIM diodes 10–11 completely cancel out in this mode, because at termination of the select pulses the voltages on select lines 21 and 22 change by equal but opposite amounts. Data voltage is again applied in row inversion mode, and can stay at or below about 5 volts for low cost.

Figure 5:
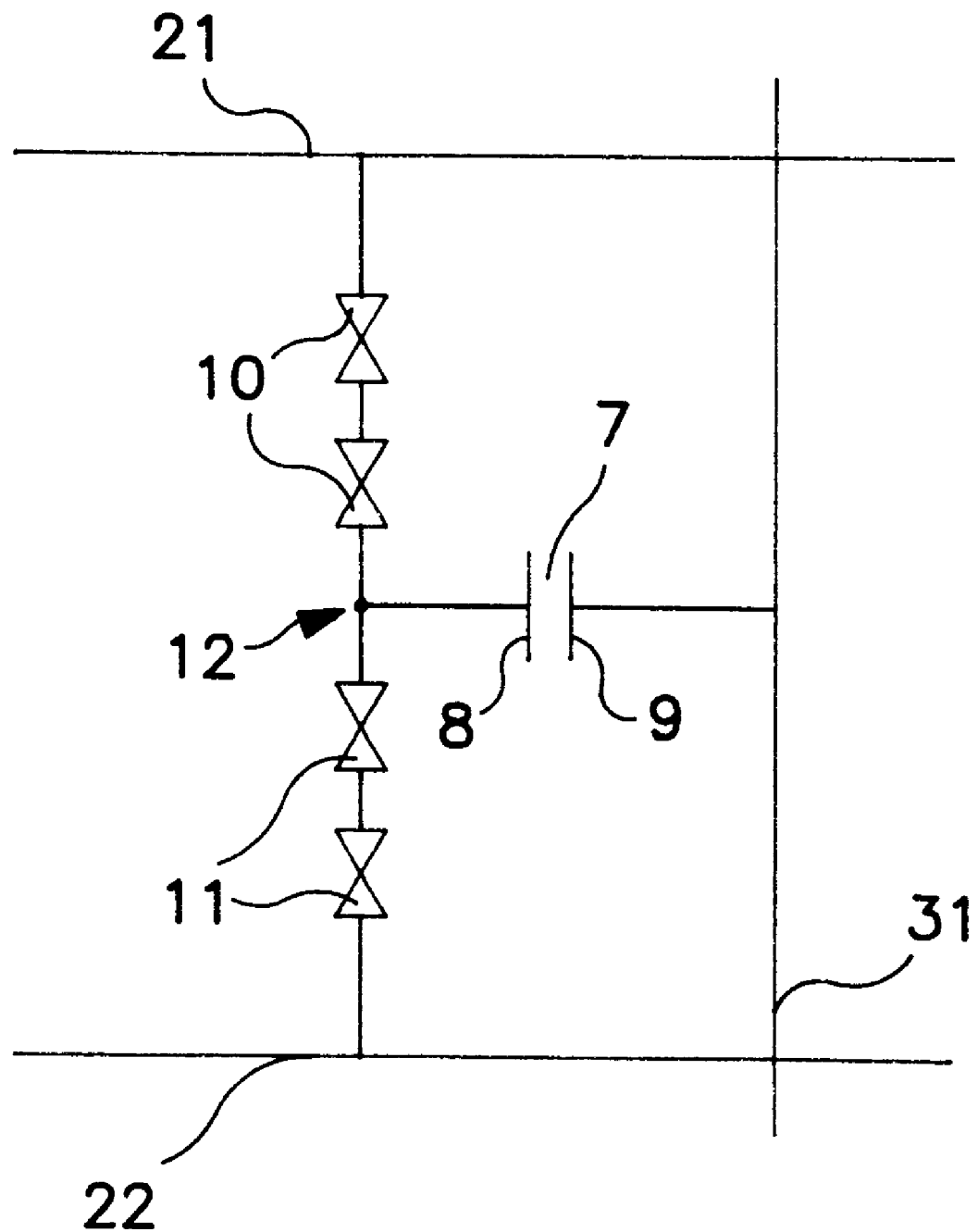
FIG. 5 is a circuit diagram of a pixel of FIG. 1, according to a fourth embodiment of this invention, wherein a pair of MIM diodes are provided on each branch (i.e. four MIMs per pixel).
Figure 6:
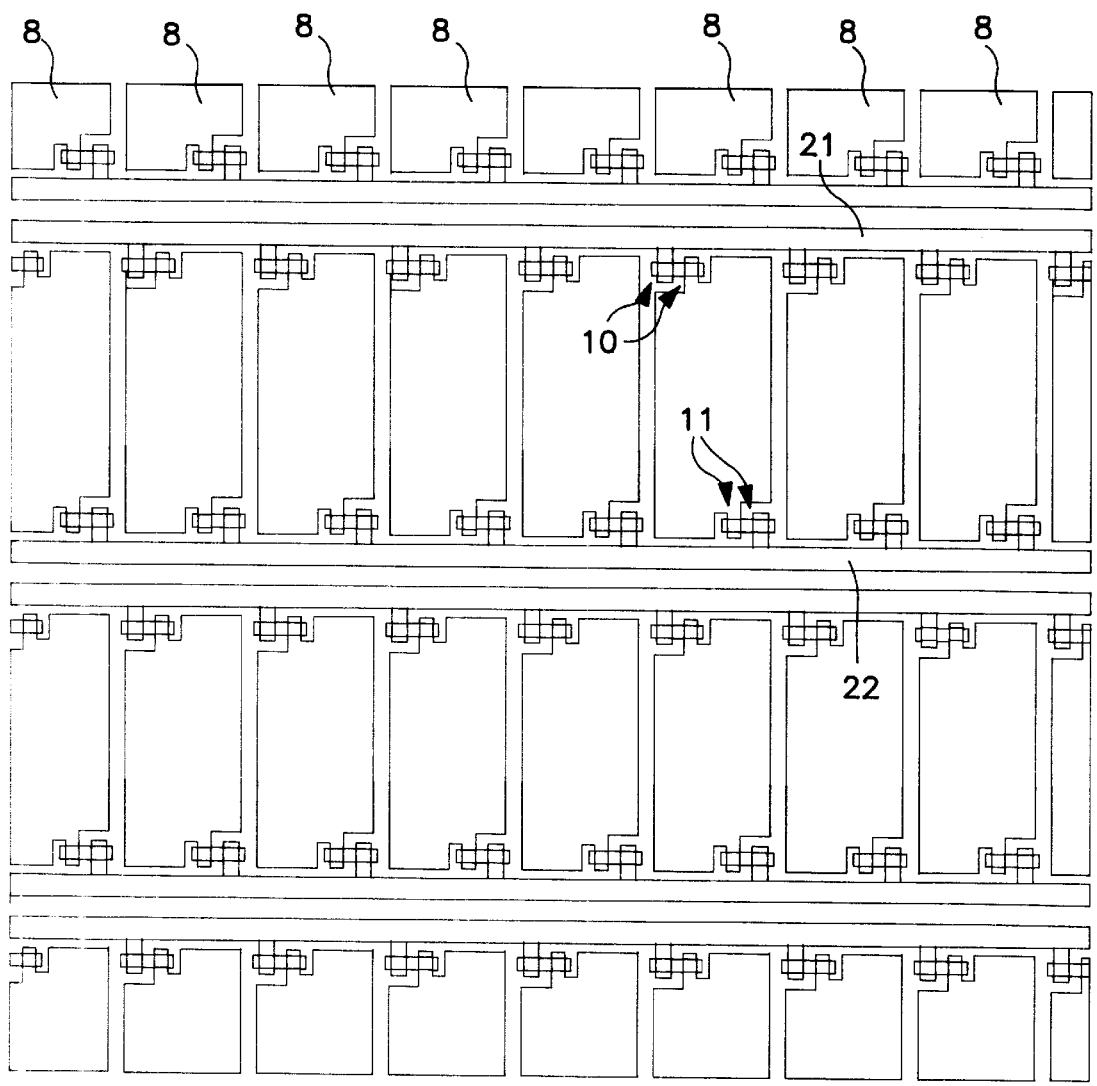
FIG. 6 is a top view of a matrix array of pixels, and corresponding MIM diodes, according to the FIG. 5 embodiment of this invention (showing the row lines and four MIMs per pixel), wherein the column or data lines on the opposite substrate are not shown.

FIGS. 5–6 illustrate a fourth embodiment of this invention, where, in contrast to the first three embodiments discussed above, a pair of separate MIM diodes are provided in each node branch. Therefore, we have four MIM diodes per pixel. This design improves the symmetrical nature of the circuit, and results in improved driving characteristics when, as discussed above, the pulse signals on each select line always have the same polarity. When using twin MIM diodes 10, 11, connected back-to-back in each branch, the pixel voltage on pixel electrode 8, and at common node 12, goes exactly to: $(V_1+V_2)\div 2$, at the end of the select time, wherein $V_1$ is the voltage pulse on line 21 and $V_2$ is the voltage pulse on line 22. This is perfectly symmetrical. FIG. 6 is a top view illustrating a matrix array of pixel electrodes 8, select lines 21, 22, and MIM diodes 10, 11, according to the FIG. 5 embodiment of this invention. This FIGS. 5–6 embodiment may use the drive schemes in any of the other embodiments of this invention (e.g. see FIGS. 2(b)–4(b)).

Once given the above disclosure, many other features, modifications, and improvements will become apparent to the skilled artisan. Such other features, modifications, and improvements are therefore considered is to be a part of this invention, the scope of which is to be determined by the following claims.

We claim:

1. A method of addressing an active matrix liquid crystal display, comprising the steps of:

providing a plurality of pixels, each of the pixels including a liquid crystal layer sandwiched between first and second pixel electrodes;

providing each pixel with first second third and fourth metal-insulator-metal (MIM) diodes that are in communication with the first pixel electrode in each pixel;

providing each pixel with first and second parallel select address lines, the first select address line being in communication with the first MIM diode in each pixel and the second select address line being in communication with the second MIM diode in each pixel;

providing each pixel with a data address line that is in communication with the second pixel electrode in each pixel, the data address lines being perpendicular to the select address lines;

coupling the first second third and fourth MIM diodes together at a common node, so that each pixel includes four separate MIM diodes, with the first and third MIM diodes being on one side of the common node and the second and fourth MIM diodes in each pixel being on the other side of the common node, and in each pixel coupling the liquid crystal layer and the first and second pixel electrodes between the common node of the pixel and the data address line of the pixel;

in a pixel, (i) simultaneously in a first frame applying a first operating potential to the first select address line and a second operating potential to the second select address line, wherein the first and second operating potentials are of substantially equal magnitude but of opposite polarity; and thereafter (ii) simultaneously in a second frame immediately following the first frame, applying a third operating potential to the first select address line and a fourth operating potential to the second select address line, wherein the third and fourth operating potentials are of substantially equal magnitude but of opposite polarity; and thereafter (iii) simultaneously in a third frame immediately following the second frame, applying a fifth operating potential to the first select address line and a sixth operating potential to the second select address line, wherein the fifth and sixth operating potentials are of substantially equal magnitude but of opposite polarity; wherein in steps (i)–(iii) above the first, third and fifth operating potentials applied to the first select address line are all of the same polarity and the second, fourth, and sixth operating potentials applied to the second select line are of a polarity opposite the polarity of the potentials applied to the first select line.

2. The method of claim 1, wherein said steps (i)–(iii) are performed in order to bias the MIM diodes into an on condition to facilitate the storage of charge in a capacitor in the pixel including the liquid crystal layer and the first and second pixel electrodes; and, in the pixel, applying charge to the data address line during application of the potentials of opposite polarity to the select address lines in order to store electric charge in said capacitor.

3. The method of claim 1, wherein said first, third, and fifth operating potentials are of substantially the same magnitude, and wherein said second, fourth, and sixth operating potentials are of substantially the same magnitude.

4. A method of addressing a liquid crystal display including metal-insulator-metal (MIM) diodes, the method comprising the steps of:
providing a plurality of pixels in the display, each of the pixels including a liquid crystal layer and a pair of electrodes which form a capacitor;
providing each pixel with first and second MIM diodes that are coupled via a common node, the common node being located between (a) the MIM diodes, and (b) the capacitor;
providing each pixel with first and second select address lines, the first select address line being coupled to the first MIM diode and the second select address line being coupled to the second MIM diode;
providing each pixel with a data address line;
in a pixel, biasing the first and second MIM diodes into an on condition to facilitate storage of charge in the capacitor of the pixel by varying a select voltage applied to the first select address line between $V_S+V_{offset}$ and $V_S-V_{offset}$ for subsequent frames, and varying a select voltage applied to the second select address line between $-V_S+V_{offset}$ and $-V_S-V_{offset}$ for subsequent frames, wherein $V_S$ is one voltage and $V_{offset}$ is another voltage that is less than $V_S$.

5. The method of claim 4, further including applying $V_S-V_{offset}$ to the first select address line and applying $-V_S-V_{offset}$ to the second select line, respectively, at the same time, and applying $V_S+V_{offset}$ to the first select line and $-V_S+V_{offset}$ to the second select line at the same time.

6. The method of claim 4, wherein all operating potentials applied to the first select line are of a positive polarity and all operating potentials applied to the second select line are of a negative polarity.

7. The method of claim 4, further comprising maintaining a substantially constant voltage gap between potentials applied to the first and second select lines, in all frames.

8. The method of claim 4, further comprising the steps of: applying holding voltages to each of the first and second select lines during non-select periods in order to improve charge retention in the pixel.

9. The method of claim 8, further comprising maintaining the holding voltages on the first and second select lines during the entire non-select period between pulses, so as to cancel out voltage shift from the first and second MIM diodes.

10. The method of claim further comprising at termination of data voltage pulses, changing voltages on the first and second select lines by equal magnitude but opposite polarity amounts in order to implement the holding voltages.

11. The method of claim 4, further comprising providing each pixel with third and fourth MIM diodes so that each pixel includes four separate MIM diodes, two on each side of the common node.

12. A pixel for a liquid crystal display, the pixel comprising:
a capacitor formed by a liquid crystal layer sandwiched between first and second electrodes;
first and second thin film diodes;
a node coupling together (i) said first thin film diode, (ii) said second thin film diode, and (iii) said capacitor;
first and second parallel select lines, said first select line connected to said first thin film diode and said second select line connected to said second thin film diode;
a data line oriented perpendicular to said first and second select lines;
simultaneous offset scan driving means for charging the pixel so as to supply data to a viewer of the display, said simultaneous offset scan driving means for simultaneously applying, in a first frame, a select voltage of $V_S-V_{offset}$ to said first select line and a select voltage of $-V_S-V_{offset}$, to said second select line, and thereafter simultaneously applying, in a second frame subsequent to said first frame, a select voltage of $V_S+V_{offset}$ to said first select line and a select voltage of $-V_S+V_{offset}$ to second select line and in a third frame subsequent to said second frame, a select voltage of $V_S-V_{offset}$ to said first select line and a select voltage of $-V_S-V_{offset}$.

13. The display of claim 12, further including means for applying a holding voltage to each of said first and second select lines between pulses.

14. The display of claim 12, wherein said first and second thin film diodes are metal-insulator-metal (MIM) diodes.

15. A pixel for a liquid crystal display, the pixel comprising:
a capacitor formed by a liquid crystal layer sandwiched between first and second electrodes;
first and second thin film diodes;
a node coupling together (i) said first thin film diode, (ii) said second thin film diode, and (iii) said capacitor;
first and second parallel select lines, said first select line connected to said first thin film diode and said second select line connected to said second thin film diode;
a data line oriented perpendicular to said first and second select lines;
simultaneous offset scan driving means for charging the pixel so as to supply data to a viewer of the display, said simultaneous offset scan driving means for simultaneously applying, in a first frame, a select voltage of $V_S-V_{offset}$ to said first select line and a select voltage of $-V_S-V_{offset}$, to said second select line, and thereafter simultaneously applying, in a second frame subsequent to said first frame, a select voltage of $V_S+V_{offset}$ to said first select line and a select voltage of $-V_S+V_{offset}$ to second select line; and
means for applying a holding voltage to each of said first and second select lines between pulses.

* * * * *